US007253539B2

(12) United States Patent
Bolz

(10) Patent No.: US 7,253,539 B2
(45) Date of Patent: Aug. 7, 2007

(54) CIRCUIT ARRANGEMENT AND METHOD FOR SEQUENTIAL CLASSIFICATION OF A PLURALITY OF CONTROLLABLE COMPONENTS

(75) Inventor: Stephan Bolz, Pfatter (DE)

(73) Assignee: Siemens Aktiengesellschaft, Munich (DE)

( * ) Notice: Subject to any disclaimer, the term of this patent is extended or adjusted under 35 U.S.C. 154(b) by 478 days.

(21) Appl. No.: 10/696,705

(22) Filed: Oct. 29, 2003

(65) Prior Publication Data

US 2004/0124126 A1 Jul. 1, 2004

(30) Foreign Application Priority Data

Oct. 31, 2002 (DE) ................................ 102 50 921

(51) Int. Cl.
*B60L 1/00* (2006.01)

(52) U.S. Cl. ...................................... 307/10.1; 123/478

(58) Field of Classification Search ............... 307/10.1, 307/31, 113, 134; 73/119 A; 123/480, 478
See application file for complete search history.

(56) References Cited

U.S. PATENT DOCUMENTS 4,402,294 A 9/1983 McHugh et al. ............ 123/480
4,928,002 A * 5/1990 Corley et al. ............... 235/479
4,972,293 A 11/1990 Verner ........................ 361/187
5,282,943 A * 2/1994 Lannutti et al. ....... 204/192.12
5,575,264 A 11/1996 Barron ....................... 123/486
6,516,658 B1 * 2/2003 McCoy et al. ............ 73/119 A
6,569,109 B2 * 5/2003 Sakurai et al. ................. 601/2
6,651,629 B2 * 11/2003 McCoy et al. .............. 123/480
6,836,224 B1 * 12/2004 Vierling et al. ............... 341/50
2002/0112698 A1 8/2002 McCoy et al. .............. 123/490
2003/0105566 A1 * 6/2003 Miller ......................... 701/33

FOREIGN PATENT DOCUMENTS

| | | | |
|---|---|---|---|
| DE | 35 10 157 | A1 | 9/1986 |
| DE | 198 51 797 | A1 | 5/1999 |
| DE | 100 07 691 | A1 | 9/2001 |
| DE | 101 53 520 | A1 | 5/2003 |
| EP | 1026384 | | 1/2000 |
| EP | 1136691 | | 9/2001 |
| WO | 00/63545 | | 10/2000 |
| WO | 02/053896 | | 7/2002 |
| WO | 02/084095 | | 10/2002 |

* cited by examiner

*Primary Examiner*—Chau N. Nguyen
*Assistant Examiner*—Daniel Cavallari
(74) *Attorney, Agent, or Firm*—Baker Botts L.L.P.

(57) ABSTRACT

A circuit arrangement for sequential classification of a plurality of controllable components, to each of which a calibration resistor (11) is assigned for which the resistance value classifies the component in relation to at least one characteristics, comprises switching means through which each calibration resistor (11) can be connected individually into a calibration network which is suitable for creation of an electrical calibration voltage (14) dependent on the value of the calibration resistor (11). The calibration network comprises a constant current source (13) and a reference resistor (12) connected in parallel to this via which the output voltage (14) can be tapped off and can be connected in parallel in each case via the switching means to a calibration resistance (11).

17 Claims, 4 Drawing Sheets

CIRCUIT ARRANGEMENT AND METHOD FOR SEQUENTIAL CLASSIFICATION OF A PLURALITY OF CONTROLLABLE COMPONENTS

PRIORITY

This application claims foreign priority of the German application DE 10250921.2 filed on Oct. 31, 2002.

TECHNICAL FIELD

The invention relates to a circuit arrangement for sequential classification of a plurality of controllable components to each of which a calibration resistor is assigned for which the resistance value classifies the component with regard to at least one characteristic, whereby switching resources are provided through which each calibration resistor can be switched individually into a calibration network which is suitable for generating an electrical calibration voltage depending on the value of the calibration resistor.

The invention also relates to a method for sequential classification of a plurality of controllable components, each of which is assigned a calibration resistor for which the resistance value classifies the component with regard to at least one characteristic, comprising the steps of sequential switching of each individual calibration resistor into a calibration network, applying an electrical voltage to the calibration resistor, tapping off an electrical calibration voltage which depends on the value of the calibration resistor at the output of the calibration network.

BACKGROUND OF THE INVENTION

A typical application of this type of circuit arrangement and method is in the control of injection valves for high-pressure diesel injection systems. These systems are subject to certain manufacturing tolerances which affect the opening and closing times of the valves as well as the throughput of fuel. Depending on the very high fuel pressures (up to 1600 bar), the in some cases very short injection durations and the extremely minimal injection amounts, even small manufacturing tolerances cause problems with the exact dosing of the injection amount and thus lead to an adverse effect on performance and motor noise. It can also lead to less complete combustion and thus to increased smoke generation. More precise manufacturing is in most cases not possible or is only possible with unacceptably high increases in costs. Conversely however it is possible, by appropriately adapting the individual control parameters, to compensate for manufacturing tolerances during operation.

Manufacturers thus resort to calibrating the injection valves individually during manufacturing and classifying them in accordance with their behavior. To identify the classification each valve is assigned a calibration resistor in the unit of which the resistance represents the corresponding classification. Determining the resistance value of the calibration resistor and comparing it with a corresponding classification list allows suitable control parameters to be found with which the individual deviations from the norm of the valve concerned can be compensated for in such a way that a desired operating behavior, e.g. as regards injection time, duration and/or quantity, is achieved.

This can be implemented in modern, microcontroller-based systems, on initialization of the valves, before the motor is started, by individually determining the valve calibration resistances, calculating the assigned control parameters or reading them out from a memory and by the control software taking them into account during operation. This avoids the measurement being affected by normal valve operation and also records the fact that a valve may have been replaced, e.g. within the context of a repair.

To avoid additional cabling the calibration resistor is often installed in conjunction with an activation coil of the valve or, with bipolar control, between the activation coils, in which case switching means, in particular transistor circuits, are provided which switch backwards and forwards between and initialization configuration and an operating configuration of the overall circuit. The calibration resistance can thus be recorded when the coil control is switched off by the evaluation circuit present in the initialization configuration.

FIG. 3 shows a basic diagram of this type of evaluation circuit according to the prior art, restricted to an individual valve, in which, to aid clarity, the switching means as well as the control of the latter are not shown. Controlled by a decoder (not shown), a series resistance circuit made up of three resistors is connected via two transistors (not shown) and four resistors (not shown) to the supply voltage of the 48 V on-board network. The connection of the first two resistors is connected to an opener coil (not shown) of a bipolar valve and thereby to the calibration resistor assigned to the valve. With further switching means (not shown) which include the above-mentioned decoder, an OR gate and also a transistor, the calibration resistor is connected to ground at the other end. The circuit is thus essentially a voltage divider circuit with the calibration resistor as an additional load resistance. In this case the voltage is tapped off between the second and the third resistance of the series resistance circuit, to divide the tapped voltage down into a value which is suitable as an input voltage for an analog multiplexer. This type of component is provided in order to accept the calibration voltages for all valves of the system in turn and switch them through to its output. The latter is connected to an appropriate analog/digital converter (ADC) input of a microcontroller (not shown). As soon as a calibration voltage is read in by the ADC of the microcontroller, the switching means switches over to the next valve or the next calibration resistor and the described procedure is repeated until the classifications of all valves are read in.

The disadvantage in this arrangement and in the corresponding procedure is the extremely high switching overhead produced by the multiplicity of components needed. For an 8-cylinder engine for example eight valves each with an evaluation circuit as described above are required. As well as the high costs, another underlying problem here is a corresponding reliability risk and the system causes space problems which can only be compensated for by an appropriately more complex and thereby expensive board layout.

SUMMARY OF THE INVENTION

The object of the present invention is to make available a circuit arrangement as well as a method which will overcome the problems of the prior art mentioned above, designed to retain the major functional features or the known circuit or of the known method while offering a technically more simple and lower cost alternative.

This object can be achieved by a circuit arrangement for sequential classification of a plurality of controllable components, to each of which a calibration resistor is assigned for which the resistance value classifies the component with regard to at least one characteristic, comprising switching means via which each calibration resistor can be switched individually into a calibration network which is suitable for creation of an electrical calibration voltage dependent on the value of the calibration resistor, wherein the calibration network comprises a constant current source and a reference resistor connected in parallel to the constant current source, wherein the output voltage can be tapped and wherein the switching means can switch each calibration resistor in parallel to the reference resistor.

For limiting the maximum output voltage of the constant current source a limiter diode as part of the calibration network can be arranged between this and a reference voltage source. The reference voltage can be a 5 V VCC supply voltage of the calibration network. A decoupling diode can be assigned to each calibration resistor via which it can be connected to the calibration network. To compensate for the voltage drop at the decoupling diode assigned to each calibration resistor a common diode in series to the reference resistor can be arranged as part of the calibration network. All calibration resistances can be sent sequentially with a measurement current from the same constant current source. The constant current source can be an operational amplifier connected as a current source or includes a transistor connected as a current source. For classification of at least one characteristic of the controllable components the latter can be provided with calibration resistors with different, and within the context of conventional manufacturing tolerances, fixed resistance values. The resistance values of the calibration resistors and the components of the calibration network can be matched to each other in such a way that the calibration voltages resulting from the calibration of two consecutive resistance values in the series of resistance values exhibit about the same difference for all resistance values. The resistance values of the calibration resistors and the components of the calibration network can be matched to each other in such a way that the calibration voltages resulting from the calibration of two consecutive resistance values in the series of resistance values exhibit about the same difference for all resistance values—relative to one of the two calibration voltages. The calibration resistors can be selected from the group of resistors having values of around 2.0 kΩ, 3.6 kΩ, 5.6 kΩ, 8.6 kΩ, 11.0 kΩ, 15.0 kΩ, 20.0 kΩ, 27.0 kΩ and 39.0 kΩ. The constant current source can deliver a current of −0.4 mA. The components may be injection valves of a high-pressure injection system of a diesel engine.

The object can further be achieved by a method for sequential classification of a plurality of controllable components, comprising the steps of:

- assigning to each component a calibration resistor for which the resistance value classifies the component in relation to at least one characteristic,
- sequential switching of each individual calibration resistor into a calibration network,
- applying an electric current from a constant current source to the calibration resistance,
- tapping off an electrical calibration voltage dependent on the value of the calibration resistance at the output of the calibration network via a reference resistor connected in parallel to the constant current source.

The calibration voltage can be injected into an input of a computation unit. The computation unit may use the injected calibration voltages to calculate control parameters that are suitable for each controllable component and/or reads these values in from a memory. The method can be executed immediately before the controllable component is put into operation.

The object may further be achieved by a method for sequential classification of a plurality of injection valves of a high-pressure injection system of a diesel engine, comprising the steps of:

- assigning to each injection valve a calibration resistor for which the resistance value classifies the injection valve with regard to at least one characteristic,
- switching each calibration resistor individually into a calibration network which is suitable for creation of an electrical calibration voltage dependent on the value of the calibration resistor,
- tapping the output voltage of the calibration network.

The calibration network may comprise a constant current source and a reference resistor connected in parallel to the constant current source. The method may further comprise the step of switching the respective calibration resistor in parallel to the reference resistor.

The invention builds on the generic circuit arrangement in that the calibration network comprises a constant current source and a reference resistor switched in parallel to this via which the output voltage can be tapped and in that a calibration resistance can be switched in parallel in each case by the switching means.

In principle this achieves a conversion from a voltage source supply to a current source supply of the circuit. The invention breaks away here from the associated concept of using the available 48 V on-board network as an energy source for the calibration circuit and goes over to the at first apparently more complex use of an additional current source, which surprisingly proves to be less effort within the totality of the concept. It is true that more effort has to be made initially in terms of circuit design to realize the additional current source. However this effort has to be made only within the calibration network common to all valves. The significant simplification of the switching means as well as of the number of other components assigned to each valve that this produces means that overall it is possible to simplify the circuit. In particular the voltage divider circuits required for each individual calibration resistance each consisting of a number of resistors are replaced by a single shared reference or measurement resistor which leads to significant savings. Since furthermore all calibration resistors can be connected sequentially to the same calibration network there is no need for an analog multiplexer.

Suitable choice of a constant current source also makes it possible for the calibration voltage, that is an output voltage of the calibration network without any special voltage dividers, to achieve the same values as a circuit according to the prior art, which makes it fully compatible with older systems.

The circuit arrangement in accordance with the invention is developed particularly advantageously by arranging a limiter diode as part of the calibration network in order to limit the maximum output voltage of the constant current source between the latter and a reference voltage source. A person skilled in the art recognizes that the diode is to be switched so that, for as long as the output voltage of the current source is below that of the reference voltage source, a blocking voltage is applied to it so that no current flows through it. If on the other hand the output voltage of the current source exceeds the reference voltage, the limiter diode applies a voltage in the pass through direction so that a current can flow which leads to a collapse of the current source voltage up to a desired maximum value.

In this case there is preferably provision for the reference voltage to be a 5 V VCC supply voltage of the calibration network This has two advantages. One is that this voltage source is always present so that no additional switching effort is required. Another is that this defines a maximum voltage which corresponds to the maximum input voltage of normal microcontrollers so that the output voltage of the calibration network can be injected into an ADC input of a microcontroller without any other security measures.

An especially preferred further development of the circuit arrangement in accordance with the invention is present if each a decoupling diode is assigned to each calibration resistor via which it is connected to the calibration network. It is fed via this decoupling diode with the measurement current of the constant current source to limit the voltage to values of less that the maximum output voltage of the constant current source. It serves, as does the previously mentioned introduction of a limiter diode for effective and technically inexpensive voltage limiting which appears desirable through the introduction of the current source to ensure that for example with normal operation of the injection valves (−1 V−+49 V), if affected by EMC noise pulses or with shorts of the coil connections to battery voltage (+14 V−+16 V) the calibration voltage does not deviate from the permitted working range of a subsequent ADC input.

Particularly advantageously there can be further provision that, to compensate for voltage drop at the decoupling diode assigned to each calibration resistor a common diode is arranged in series with the reference resistor as part of the calibration network. One effect of this compensation is that the calibration voltages are not corrupted by the security measures mentioned but are only effectively limited. In addition shared use of a compensation diode saves having to use compensation diodes for each individual calibration resistor.

Advantageously all calibration resistances can be sent sequentially with one measuring current from the same constant current source. The switching means necessary for this can be restricted to a consecutive connection of the individual calibration resistances to ground as well as a simple connection between the relevant decoupling diodes and the calibration resistor.

Basically the constant current source used in accordance with the invention can be implemented in many different ways. It is however especially advantageous if the constant current source is an operational amplifier connected as a current source A circuit of this type is well know to someone skilled in the art and is a simple and cheap design and can also be fed from the 5V VCC voltage source which is generally always present for a multiplicity of electronic circuits in the overall system. Alternatively for example a constant current source can be used which includes a transistor connected as a current source, especially if an additional supply voltage of for example 48V is available in any event.

Preferably the controllable components for classifying at least one of their features are provided with calibration resistances with different and within the context of conventional manufacturing tolerances, fixed resistance values. This means that no changes have to be made to the circuit arrangement described if one of the components to be controlled has to be replaced for example since the resistance that classifies it also replaced with it in one unit which can be a simple fixed resistor with a suitable resistance value. In a preferred development of the circuit arrangement in accordance with the invention there can be provision for the resistance values of the calibration resistors and the components of the calibration network to be matched so that for calibration of two consecutive resistance values in the series of resistance values the resulting calibration voltages exhibit the approximately same difference for all resistance values. This means that the resistance values for classifying the components to be controlled is designed in such a way that the resulting calibration voltages form a horde of voltage values at around equal distances, which allows an optimum separation and thereby an optimum detection of the relevant components.

Alternatively the calibration resistors and calibration network can also be synchronized in such a way that on calibration of two consecutive resistance values in the series of resistance values the resulting calibration voltages exhibit about the same relative difference—related to one of the two calibration voltages. Thus the difference between two consecutive voltages in the lower range is smaller than in the upper range. Which of the two synchronization values given above is to be given precedence is basically determined by the type of the subsequent evaluation method and components.

It has been shown to be particularly useful for the calibration resistances to have values of around 2.0 kΩ, 3.6 kΩ, 5.6 kΩ, 8.6 kΩ, 11.0 kΩ, 15.0 kΩ, 20.0 kΩ, 27.0 kΩ and 39.0 kΩ.

In an especially preferred embodiment of the present invention it has proved useful for the constant current source delivers a current of −0.4 mA.

The invention builds on the generic method such that the calibration network is sent a current by a constant current source in such a way that the calibration network and calibration resistor and the calibration resistance are sent a constant current by a constant current source and the calibration voltage is tapped of via a reference resistance connected in parallel to the constant current source. This produces the advantages described above of significant simplification of the underlying circuit arrangement compared to a method according to the prior art in which the calibration resistors to be calibrated must be connected in turn to a voltage divider circuit for voltage tapping.

In a preferred embodiment of the method in accordance with invention the calibration voltage is injected into an input of a computation unit. This is advantageously a microcontroller, which preferably uses the injected calibration voltages to calculate suitable control parameters for each component to be controlled and/or reads them from a memory.

To enable changes such as for example those produced by the replacement of one of the controllable components including its calibration resistance, there is preferably provision for executing the method in accordance with the invention directly before the components to be controlled are to be put into operation.

Although the circuit arrangement in accordance with the invention and the method in accordance with the invention can basically be used for any type of controllable component classified by calibration resistances, it is especially useful if the components to be controlled are injection valves of a high-pressure injection system of a diesel engine. Because of the multiplicity of injection valves that are present in this type of engine it is the savings produced by the invention that are especially significant.

BRIEF DESCRIPTION OF THE DRAWINGS

The invention will now be typically described with reference to the accompanying drawings using preferred exemplary embodiments.

The diagrams show.

DETAILED DESCRIPTION OF THE PREFERRED EMBODIMENTS

Figure 3:
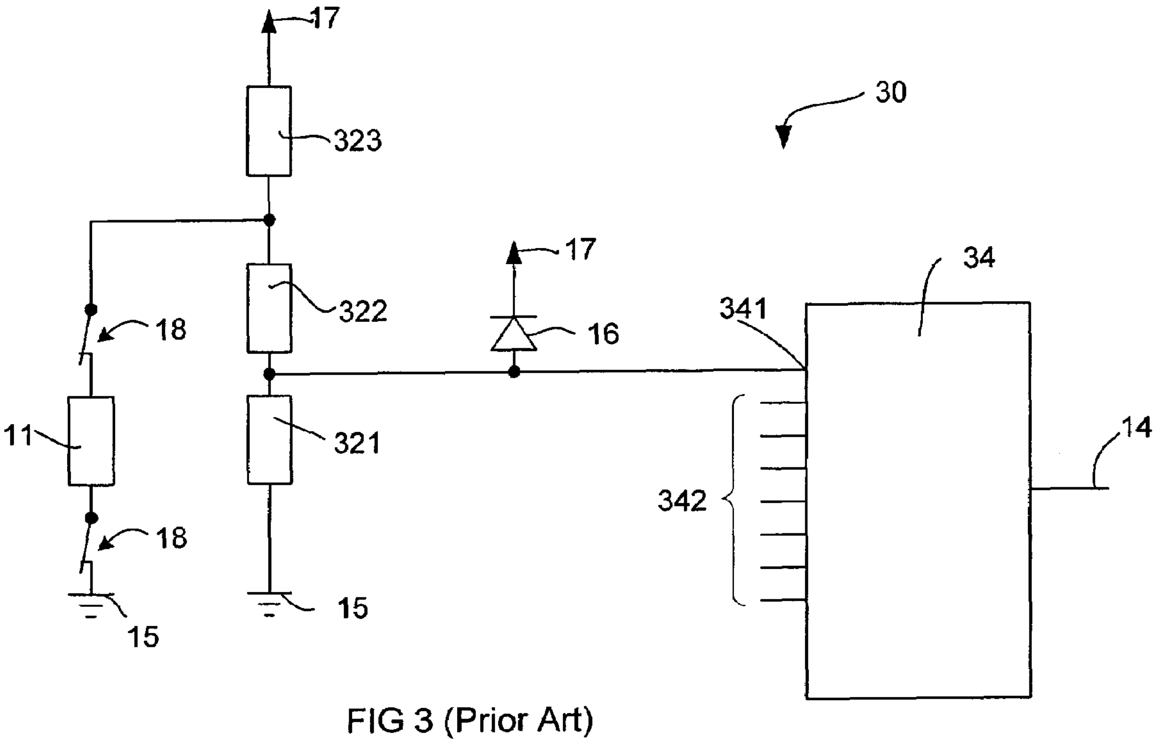
FIG 3 (Prior Art)
FIG. 3 a simplified basic diagram of a circuit arrangement in accordance with the prior art.

FIG. 3 shows a simplified basic diagram of a circuit arrangement 30 according to the prior art A calibration resistance 11 is connected to an opener coil (not shown) of an injection valve of a high-pressure injection system for a diesel engine. It is connected on one side, by switching means 18, to ground 15. On the other side it is connected to a series circuit of voltage divider resistors 321, 322 and 323 which is connected on one side to ground and on the other side via switching means 18, to the +48 V supply voltage 33 of the on-board network The circuit configuration shown is established by suitable control of the switching means to initialize the injection valves before the engine is started. Since the calibration resistance 11 is connected in parallel to the voltage divider resistances 321 and 322, a voltage divider circuit with resistor 323 on one side and resistors 321 and 322 on the other side is implemented with calibration resistor 11 as additional load resistance. The relationships produced here between the falling output voltage via resistors 321 and 322 as a function of the known input voltage and the calibration resistance to be determined are known to the person skilled in the art. In the circuit arrangement shown a further voltage divider is implemented since the output voltage used is tapped at the node between resistors 321 and 322. This measure is used to limit the output voltage to a range corresponding to the input range of the downstream analog multiplexer 34 (as a rule 0-5 V), and still enable the right resistance values for the calibration resistance in order of magnitude of appr. 1 a few 10 kΩ to be used. A further voltage limiting measure is realized by diode 16 which is connected against the 5 V-VCC supply voltage of the electronics. If the output voltage of the voltage divider circuit exceeds the permitted range of 0-5 V, the diode conducts so that the overvoltage will be limited and the inputs 341, 342 of multiplexer 34 are protected. The multiplexer switches the voltage at input 341 through to its output where the calibration voltage 14 is then present and is routed to a microcontroller (not shown) for further evaluation. After recording a calibration resistor the switching means switch to a next calibration resistor and the corresponding voltage divider circuit of which the output voltage is then directed to a further input 342 of multiplexer 34. This procedure is repeated until all calibration resistors are recorded and microcontrollers can calculate the parameters required to control the individual valves or read them in from a memory. The engine can then be started. The disadvantages of this circuit arrangement have already been explained above.

Figure 1:
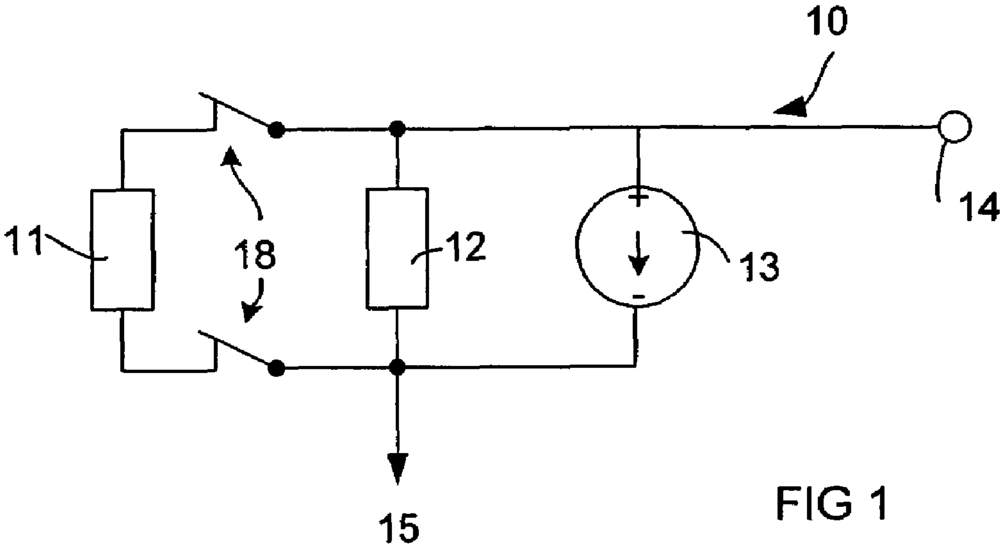
FIG. 1 a simplified basic diagram of a circuit arrangement in accordance with the diagram as per a first exemplary embodiment.

FIG. 1 shows an alternate circuit 10 in accordance with the invention as per a first exemplary embodiment. As with FIG. 3, to aid clarity, the Figure has been restricted to showing components relevant to the invention. Where the same reference characters are used in the drawings the corresponding components have the same function. Instead of the voltage divider circuit according to the prior art, a single reference or measuring resistor 12 is connected here in parallel to the calibration resistor to be recorded in each case. A constant current source is connected in parallel to the two which feeds the parallel circuit of the two resistors 11 and 12 with a direct current $I_{DC}$ which always has the same current strength, regardless of the relevant resistance value. However the high-resistance tappable calibration voltage 14 depends on the resistance value of calibration resistor 11. By suitable selection of the reference resistor 12 the circuit can be set up in such a way that the calibration voltage 14 as a function of calibration resistor 12 behaves in the same way as the calibration voltage of the voltage divider circuit in accordance with the prior art. With reference to FIG. 3 the reference resistor 12 in FIG. 1 and $I_{DC}$ would have to have the values $$R_{12} = \frac{R_{323}(R_{321} + R_{322})}{(R_{321} + R_{322} + R_{323})}$$

und $$I_{DC} = 48\ V \times \frac{R_{321}(R_{321} + R_{322})}{R_{323}(R_{321} + R_{322})}$$

with R in the equations generally designating a resistance in the drawings and the indices corresponding to the reference characters in FIGS. 1 and 3. Such a choice of components is particularly advantageous when the circuit arrangement in accordance with the invention is also to be used on older systems which were originally designed for a calibration network according to the prior art. However, any other choice of components is naturally possible and this choice can be optimized to suit to application concerned. Circuit arrangement 10 merely shows the section of an overall circuit necessary to record an individual calibration resistor and is described in greater detail in conjunction with FIG. 5. However this Figure already shows that the same calibration network will be used for all calibration resistors of a system and its output voltage, i.e. the calibration voltage can be fed into the subsequent microcontroller without further multiplexing.

Figure 2:
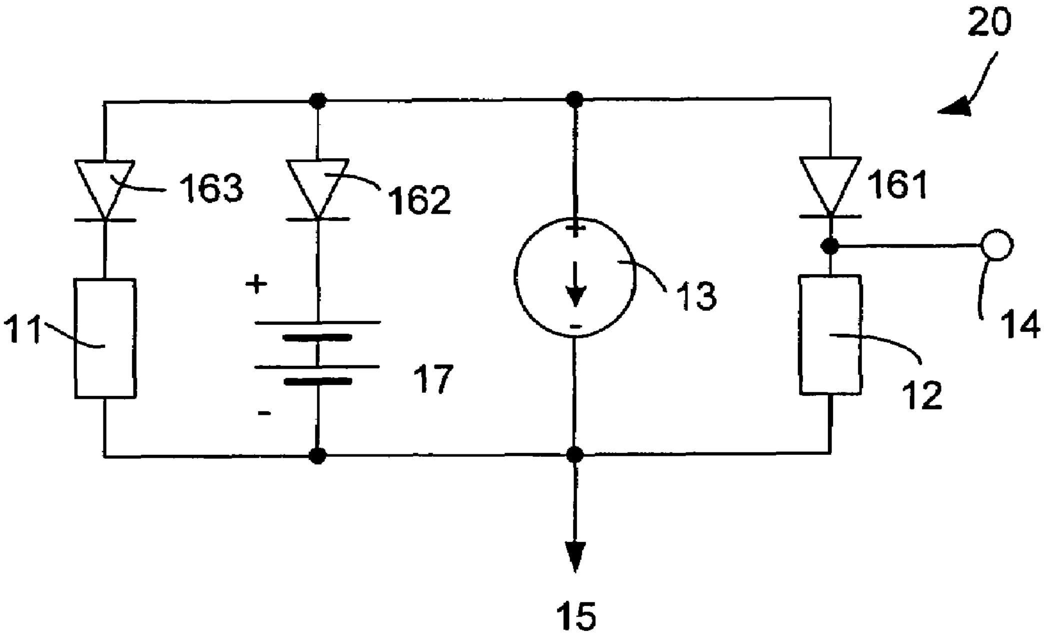
FIG. 2 a simplified basic diagram of a circuit arrangement in accordance with the diagram as per a second exemplary embodiment.

FIG. 2 shows a particularly advantageous development 20 of the circuit arrangement in accordance with the invention. It expands circuit arrangement 10 by diodes 161, 162 and 163 as well as by voltage source 17. The other components correspond to the relevant components with the same reference character in FIG. 1.

Decoupling diode 163 and limiter diode 162 are provided to restrict the calibration voltage to values that can be read into subsequent evaluation electronics. Decoupler diode 163 decouples the calibration network shown from the control system of the valve, neither of which are shown. This type of decoupling is useful since with conventional injection valves for example the calibration resistance is connected to the opener coil of the assigned valve. When the valves are operating according to specification voltages in the order of magnitude of −1 V−+49 V occur. These can be decoupled from the calibration network by decoupling diode 163.

Limiter diode 162 by contrast is connected to the 5 V VCC supply voltage 17. If the calibration voltage exceeds this maximum permitted value, diode 162 receives a voltage in the conducting direction so that voltage 14 is effectively limited.

Finally, compensation diode 161 has the task of compensating for the voltage drop across decoupling diode 163 so that with the voltage division that is otherwise present, no corruption of the measured values, i.e. of calibration voltage 14 occurs.

Figure 4:
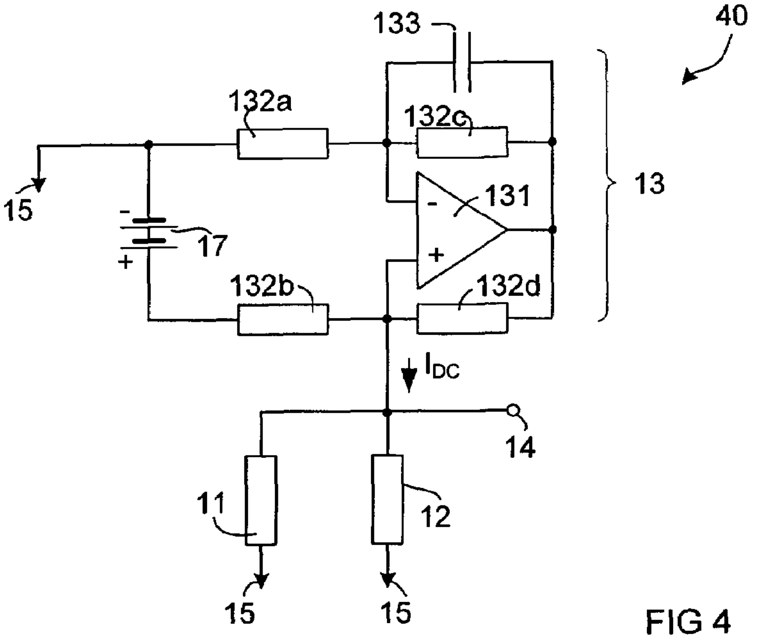
FIG. 4 a simplified, basic diagram of the circuit arrangement in accordance with the invention from FIG. 1, taking particular account of a constant current source as per an advantageous exemplary embodiment.

FIG. 4 shows a circuit 40 which corresponds to the circuit 10 from FIG. 1 but shows a particularly advantageous embodiment of the current source 13. The current source 13 in this case is designed as an operational amplifier 131, connected as a constant current source. Energy is fed via the VCC power supply 17. This current source circuit is basically known to a person skilled in the art so that it is not necessary to discuss the dimensioning of resistors 132*a-d* in more detail. Capacitor 133 can be inserted in specific cases for stabilization. The other components correspond to the relevant components with the same reference character in FIG. 1. 1.

Figure 5A:
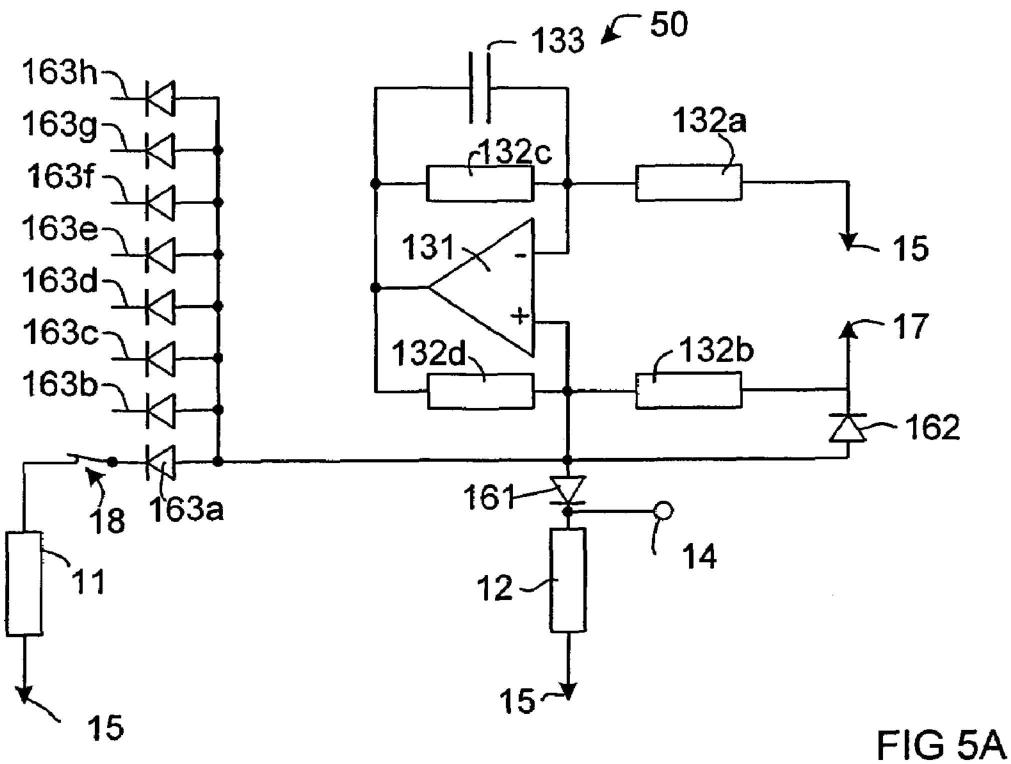
FIG. 5*a* a simplified, basic diagram of the circuit arrangement in accordance with the invention from FIG. 1, taking particular account of a constant current source as per FIG. 2 and expanded to record a plurality of calibration resistances.

FIG. 5*a* shows an expansion of the circuit of FIG. 2 to control of a plurality of valves, in the present case of eight valves (not shown). A constant current source, in accordance with the particularly advantageous embodiment explained in FIG. 4 is used as a current source. As can be easily seen, the entire calibration network can be connected to the calibration resistor of interest in the most simple way with the switching resources 18 able to be designed very simply and except for decoupling diodes 163*a-h*, all components of the calibration network only having to be simple designs. To improve clarity the calibration resistors to be connected to the decoupling diodes 163*b-h* are not shown in the diagram. The other components correspond to the relevant components with the same reference character in FIGS. 1, 2 and 4.

Figure 5B:
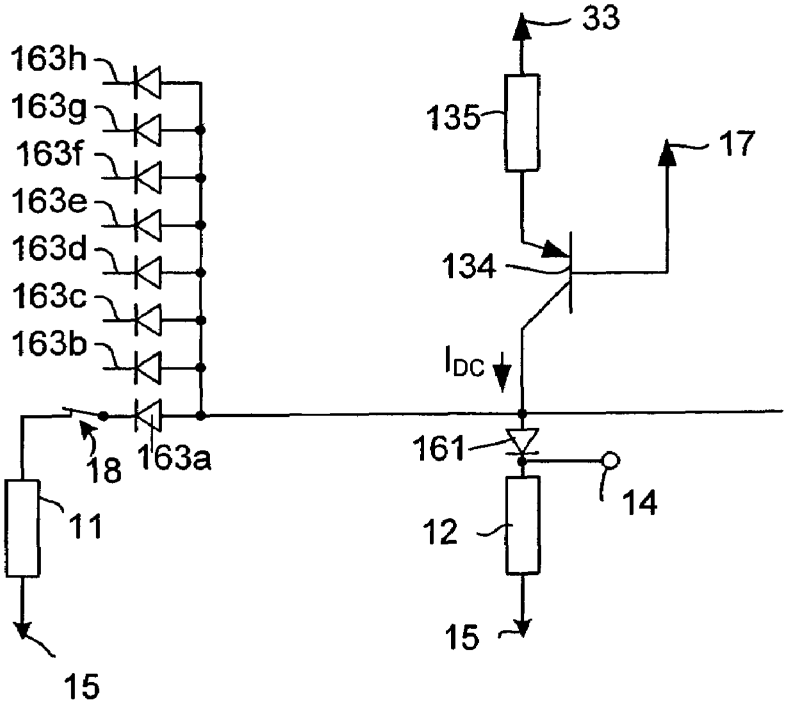
FIG. 5*b* a simplified, basic diagram of the circuit arrangement in accordance with the invention from FIG. 1, taking particular account of a constant current source which comprises a transistor connected as a current source, whereby the circuit arrangement is also expanded for recording a plurality of calibration resistors.

FIG. 5*b* shows an alternate embodiment of the circuit arrangement in accordance with the invention, with the circuit arrangement in accordance with FIG. 5*b* differing from that shown in FIG. 5*a* in the way that the constant current source is implemented. With the embodiment of the circuit arrangement in accordance with the invention shown in FIG. 5*b* the constant current source comprises a transistor 134 of which the emitter is connected via a resistor 135 to the 48 V power supply 33 which is still available for operating injection valves. The base of transistor 134 is connected to the VCC power supply 17 and collector current of transistor 134 represents the constant current IDC. The level of constant current IDC depends in this case on the voltage at resistor 135 and the value of resistor 135. The voltage at resistor 135 corresponds to the difference from the 48 V supply voltage 33 and the total of the VCC supply voltage 17 and base emitter voltage of transistor 134. When the VCC 5 V supply voltage and the base-emitter voltage are around 0.7 V the voltage at resistor 135 for example has a value of around 42.3 V. For a constant current $I_{DC}$ of −0.4 mA a value of 105.75 kΩ is produced for resistor 135 in this case. Limiting of the output voltage, such as by diode 162 of FIG. 5*a* can be omitted for the embodiment according to FIG. 5*b* since the voltage at the collector of transistor 134 is limited to around 5.6 V—dictated by the connection of the base to the VCC supply voltage 17. By its voltage drop of around 0.7V, diode 161 ensures that the output voltage remains smaller overall than the VCC supply voltage 17. It should be noted that the 48 V supply voltage 33, the tolerance of the VCC supply voltage 17, the temperature-dependent drift of the base-emitter voltage of transistor 134 and current amplification factor of transistor 134 have an effect on the accuracy of constant current source IDC. The constant current source according to FIG. 5*b* features a significantly more simple layout than the constant current source according to FIG. 5*b*, which however must be paid for under some circumstances by the slightly lower accuracy of the constant current $I_{DC}$.

Figure 6:
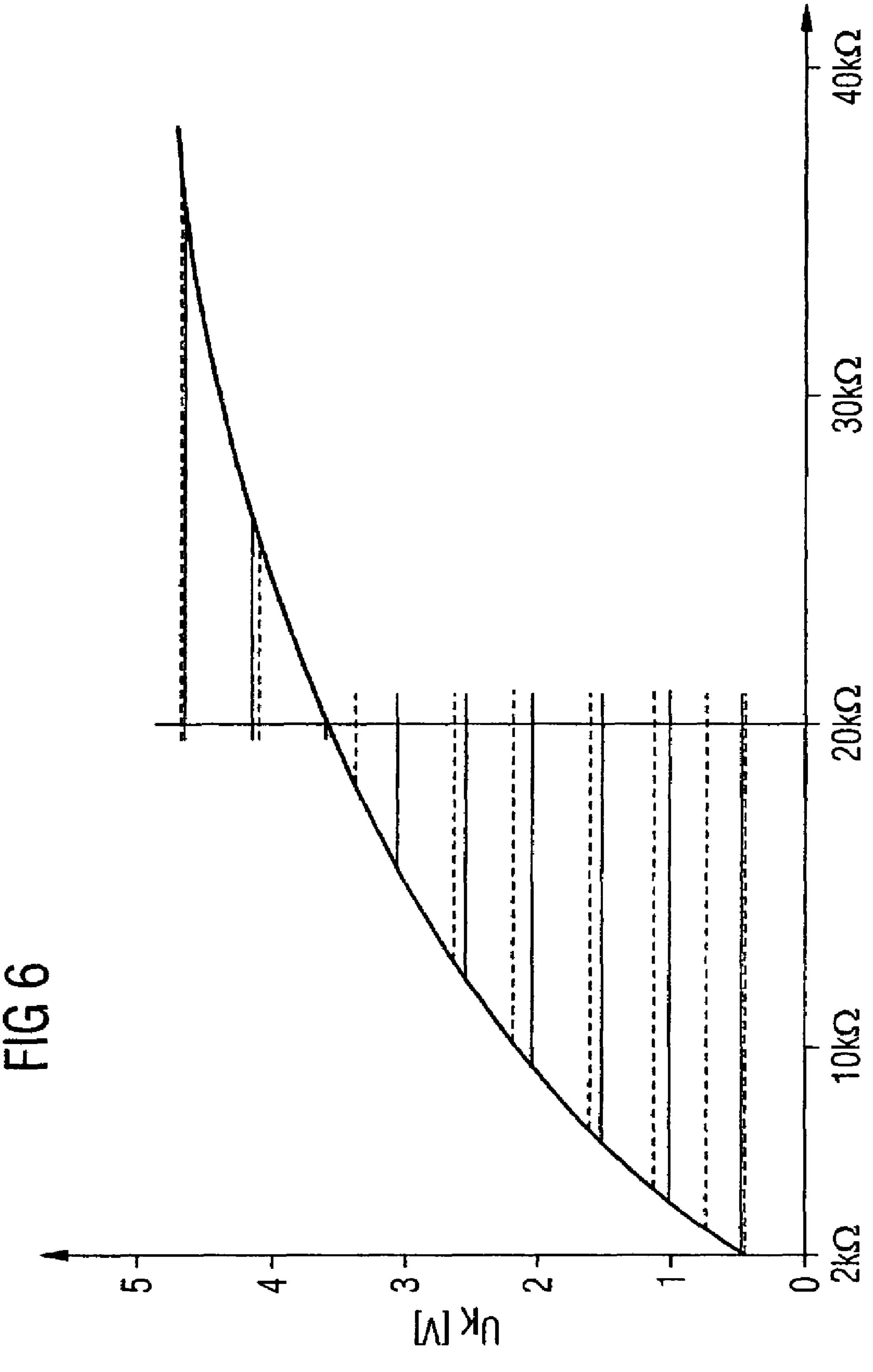
FIG. 6 a typical diagram of a calibration voltage as a function of two different sets of calibration resistances to demonstrate a typical synchronization of calibration resistances and calibration network.

FIG. 6 shows two advantageous exemplary embodiments of the synchronization of the calibration resistors using the calibration voltage as a function of the calibration resistance with a given $I_{DC}$ of 0.4 mA. Preferably eight resistance values are provided for the calibration resistance which represent eight classifications with regard to at least one characteristic of the assigned injection valves. The broken lines show the values for a set of calibration resistances which are graduated so that the percentage difference of two consecutive resistance values in the series of calibration resistances is always the same size. The solid lines on the other hand represent the preferred form of embodiment, with which the relative difference of two calibration voltages for consecutive resistance values in the series of calibration resistors is always around the same size. For example the appropriate pairs of values are given below which particularly reflect preferred resistance and voltage ranges. Table 1 here shows possible pairs of values with approximately equal resistance values. Table 2 shows possible pairs of values with approximately equal voltage difference

TABLE 1

| R (calibration resistance 11) [kΩ] | U (calibration voltage 14) [V] |
|---|---|
| 2.0 | 0.716 |
| 3.0 | 1.020 |
| 4.3 | 1.369 |
| 6.2 | 1.821 |
| 9.1 | 2.374 |
| 12.0 | 2.817 |
| 18.0 | 3.499 |
| 27.0 | 4.172 |
| 39.0 | 4.736 |

TABLE 2

| R (calibration resistance 11) [kΩ] | U (calibration voltage 14) [V] |
|---|---|
| 2.0 | 0.824 |
| 3.6 | 1.278 |
| 5.6 | 1.760 |
| 8.2 | 2.282 |
| 11.0 | 2.726 |
| 15.0 | 3.227 |
| 20.0 | 3.699 |
| 27.0 | 4.179 |
| 39.0 | 4.716 |

The exemplary embodiments shown are of course merely to be taken as typical illustrations of the especially advantageous embodiments of the circuit arrangement in accordance with the invention and of the method in accordance with the invention. The person skilled in the art will be able to derive a plurality of variations from the disclosure published without getting away from the core of the invention.

The features of the invention published in this description, in the drawings and in the claims can be of importance both individually and in any combination for realizing the invention.

I claim:

1. A circuit arrangement for sequential classification of a plurality of controllable components, to each of which a calibration resistor is assigned for which the calibration resistance value classifies the component with regard to at least one characteristic, comprising switching means via which each calibration resistor can be switched individually into a calibration network which is suitable for creation of an electrical calibration voltage dependent on the value of the calibration resistor, wherein the calibration network comprises a constant current source and a reference resistor connected in parallel to the constant current source, wherein the output voltage can be tapped and wherein the switching means can switch each calibration resistor in parallel to the reference resistor.

2. The circuit arrangement according to claim 1, wherein for limiting a maximum output voltage of the constant current source a limiter diode as part of the calibration network is arranged between the constant current source and a reference voltage source.

3. The circuit arrangement according to claim 2, wherein the reference voltage is a 5 V supply voltage of the calibration network.

4. The circuit arrangement according to claim 1, wherein a decoupling diode is provided for each calibration resistor via which the calibration resistor can be connected to the calibration network.

5. The circuit arrangement according to claim 4, wherein to compensate for a voltage drop at the decoupling diode which is provided for each calibration resistor, a common diode in series to the reference resistor is arranged as part of the calibration network.

6. The circuit arrangement according to claim 1, wherein the switching means are operable to feed each of the calibration resistances sequentially with a measurement current from the same constant current source.

7. The circuit arrangement according to claim 1, wherein the constant current source is an operational amplifier connected as a current source or includes a transistor connected as a current source.

8. The circuit arrangement according to claim 1, wherein the resistance values of the calibration resistors and components of the calibration network are matched to each other in such a way that first and second calibration voltages resulting from the calibration of two consecutive resistance values in a series of resistance values exhibit about the same voltage difference for all resistance values.

9. The circuit arrangement according to claim 1, wherein the calibration resistors are selected from the group of resistors having values of approximately 2.0 kΩ, 3.6 kΩ, 5.6 kΩ, 8.6 kΩ, 11.0 kΩ, 15.0 kΩ, 20.0 kΩ, 27.0 kΩ and 39.0 kΩ.

10. The circuit arrangement according to claim 1, wherein the constant current source delivers a current of –0.4 mA.

11. The circuit arrangement according to claim 1, wherein the controllable components are a plurality of injection valves of a high-pressure injection system of a diesel engine.

12. A method for sequential classification of a plurality of controllable components, comprising the steps of:

assigning to each component a calibration resistor for which the resistance value classifies the component in relation to at least one characteristic, sequential switching of each individual calibration resistor into a calibration network, applying an electric current from a constant current source to the calibration resistance, tapping off an electrical calibration voltage dependent on the value of the calibration resistance at the output of the calibration network via a reference resistor connected in parallel to the constant current source.

13. The method according to claim 12, wherein the calibration voltage is fed into an input of a computation unit.

14. The method according to claim 13, wherein the computation unit uses the fed calibration voltages to calculate control parameters that are suitable for each controllable component and/or reads these values in from a memory.

15. The method according to claim 12, wherein the method is executed immediately before the controllable component is put into operation.

16. A method for sequential classification of a plurality of injection valves of a high-pressure injection system of a diesel engine, comprising the steps of:

assigning to each injection valve a calibration resistor for which the resistance value classifies the injection valve with regard to at least one characteristic, switching each calibration resistor individually into a calibration network comprising a constant current source and a reference resistor connected in parallel to the constant current source, the calibration network being suitable for creation of an electrical calibration voltage dependent on the value of the calibration resistor, tapping an output voltage of the calibration network.

17. The method according to claim 16, further comprising the step of switching the respective calibration resistor in parallel to the reference resistor.

* * * * *